United States Patent
Shulga et al.

(10) Patent No.: US 9,996,425 B2
(45) Date of Patent: Jun. 12, 2018

(54) SYSTEM AND METHOD FOR AGENTLESS BACKUP OF VIRTUAL MACHINES

(71) Applicant: Acronis International GmbH, Schaffhausen (CH)

(72) Inventors: Victor Shulga, Moscow (RU); Vasily Semyonov, Moscow (RU); Stanislav Protasov, Moscow (RU); Mark Shumlevich, Moscow (RU); Serguei Beloussov, Singapore (SG)

(73) Assignee: ACRONIS INTERNATIONAL GMBH, Schaffhausen (CH)

( * ) Notice: Subject to any disclaimer, the term of this patent is extended or adjusted under 35 U.S.C. 154(b) by 0 days. days.

(21) Appl. No.: 15/131,872

(22) Filed: Apr. 18, 2016

(65) Prior Publication Data

US 2017/0300386 A1    Oct. 19, 2017

(51) Int. Cl.
*G06F 11/14*    (2006.01)
*G06F 9/455*    (2018.01)

(52) U.S. Cl.
CPC ...... *G06F 11/1451* (2013.01); *G06F 9/45558* (2013.01); *G06F 11/1469* (2013.01); *G06F 2009/45583* (2013.01); *G06F 2201/805* (2013.01); *G06F 2201/815* (2013.01); *G06F 2201/84* (2013.01)

(58) Field of Classification Search
CPC .............. G06F 11/1451; G06F 11/1469; G06F 11/1446; G06F 11/1448; G06F 2201/815; G06F 2201/84
See application file for complete search history.

(56) References Cited

U.S. PATENT DOCUMENTS

| 2009/0313447 | A1* | 12/2009 | Nguyen | G06F 11/1451 711/162 |
| 2014/0095816 | A1* | 4/2014 | Hsu | G06F 3/0655 711/162 |
| 2016/0191547 | A1* | 6/2016 | Zafar | H04L 63/1416 726/23 |
| 2016/0292074 | A1* | 10/2016 | Awasthi | G06F 13/4027 |
| 2016/0371104 | A1* | 12/2016 | Zamir | G06F 9/45533 |

* cited by examiner

*Primary Examiner* — Jigar Patel
(74) *Attorney, Agent, or Firm* — Arent Fox LLP; Michael Fainberg (57) ABSTRACT

A system and method is disclosed for performing agentless backup of a virtual machine using a temporary attached virtual disk. An example method includes creating a virtual machine disk in a datastore, loading a software application in the virtual machine disk, the software application being configured to collect metadata relating to at least one application executing in an operating system of the virtual machine, communicatively coupling the datastore to the virtual machine, collecting the metadata relating to the at least one application executing in the operating system of the virtual machine, generating a snapshot of the virtual machine, and storing a backup of the virtual machine in a backup archive based on the snapshot.

18 Claims, 7 Drawing Sheets

SYSTEM AND METHOD FOR AGENTLESS BACKUP OF VIRTUAL MACHINES

FIELD OF TECHNOLOGY

The present disclosure generally relates to the field of electronic data backup, and, more particularly, to a system and method for performing agentless backup of a virtual machine using a temporary attached virtual disk.

BACKGROUND

Continuing advances in storage technology provide significant amounts of digital data to be stored cheaply and efficiently. However, this means that significant amounts of data can be lost in the event of a failure or catastrophe. Accordingly, data backup of original data is a critical component of computer-based systems. The original data typically resides on a hard drive, or on an array of hard drives, but may also reside on other forms of storage media, such as solid state memory. Data backups are critical for several reasons, including disaster recovery, restoring data lost due to storage media failure, recovering accidentally deleted data, and repairing corrupted data resulting from malfunctioning or malicious software.

A virtual machine ("VM") is a software abstraction of an underlying physical (i.e., hardware) machine that enables one or more instances of an operating system, or even one or more operating systems, to run concurrently on a physical host machine. Virtual machines have become popular with administrators of data centers, which can contain dozens, hundreds, or even thousands of physical machines. The use of virtual servers greatly simplifies the task of configuring and administering servers in a large scale environment, because a virtual machine may be quickly placed into service without incurring the expense of provisioning a hardware machine at a data center. Virtualization is highly scalable, enabling servers to be allocated or de-allocated in response to changes in demand. Moreover, support and administration requirements may be reduced because virtual servers are readily monitored and accessed using remote administration tools and diagnostic software.

In one aspect, a virtual server consists of three components. The first component is virtualization software configured to run on the host machine which performs the hardware abstraction, often referred to as a hypervisor. The second component is a data file which represents the filesystem of the virtual machine and typically contains the virtual machine's operating system, applications, data files, etc. A virtual machine data file may be a hard disk image file, such as, without limitation, a Virtual Machine Disk Format ("VMDK") format file. Thus, for each virtual machine, a separate virtual machine file is required. The third component is the physical machine on which the virtualization software executes. A physical machine may include a processor, random-access memory, internal or external disk storage, and input/output interfaces, such as network, storage, and desktop interfaces (e.g., keyboard, pointing device, and graphic display interfaces.)

Currently, existing data backup applications can make backups of virtual machine data files without using a software agent (i.e., agentless backup). In other words, existing applications can create backups without installing software within the virtual machine itself. However, at certain times, there is still a need during the backup of the virtual machine to execute some actions inside the virtual machine (i.e., the machine where the backup is made). For example, when the application creates a backup of the virtual machine running on the MS Exchange/MS SQL/MS Active Directory or a similar database server, the backup application will likely need to: (1) collect metadata about services running inside the virtual machine, and (2) store the collected data in a data archive. With existing backup applications, these operation cannot be performed from outside the virtual machine because, for example, certain operations such as collecting metadata can only be performed locally from inside the virtual machine. An additional problem is that after the completion of backup procedure, often the backup applications will need to perform necessary additional actions, such as truncating logs of the services to prepare them for the next backup.

Thus, while the existing backup methods of a virtual machine may be called "agentless", they are in fact not agentless from a practical standpoint. Instead, to perform the operations noted above and others, a special "mini-agent" is copied into the virtual machine (i.e., on its file system) before the backup is performed and then removed after the backup is created. While the "mini-agent" is on the virtual machine, the "mini-agent" performs execution of the necessary actions, saves the results in the filesystem of the virtual machine, collects the results and transfers the results to an agent to be archived. Moreover, in the event of unforeseen problems, the "mini-agent" and the results of its operation may remain inside the virtual machine. In addition, it is also not always possible to modify the filesystem of the virtual machine (e.g., due to lack of disk space) and there is a need to modify the registry in the virtual machine during the backup operation.

Figure 1:
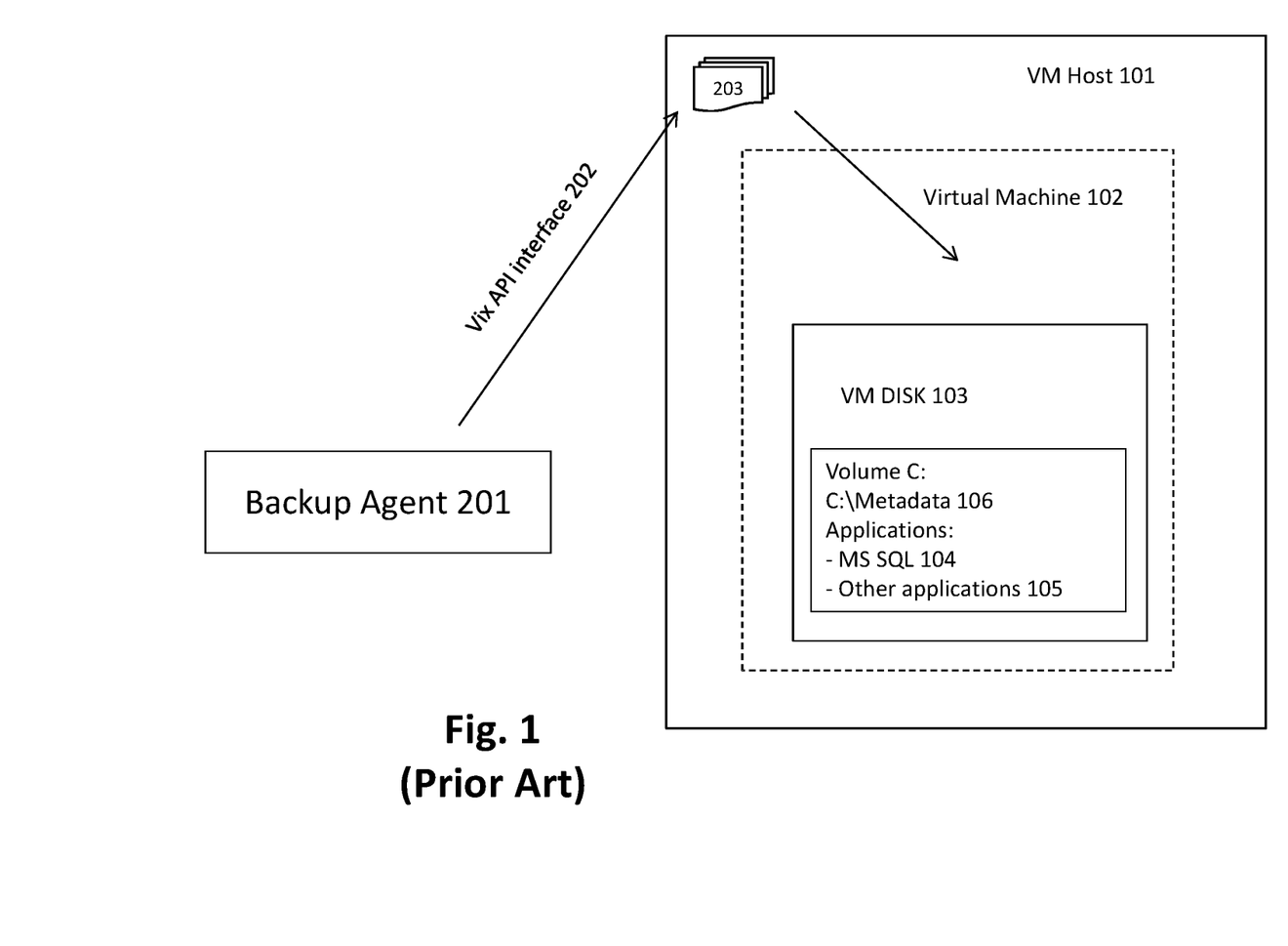
FIG. 1 illustrates a conventional system for performing a backup procedure of a virtual machine.

FIG. 1 illustrates a conventional system for performing a backup procedure of a virtual machine. As shown, a virtual machine 102 is run on a host machine 101. In general, virtual machines, such as that shown in FIG. 1, can be configured using any appropriate server virtualization technology, such as that provided by VMware, Inc. of Palo Alto, Calif., including vSphere®. VSphere® is a suite of tools offering the ability to perform cloud computing utilizing enterprise-level virtualization products such as VMwares ESX® and/or ESXi. VSphere allows multiple virtual machines to run on any ESX host, although only a single virtual machine 102 is illustrated in FIG. 1. Other virtual machine technology may be used including any appropriate virtual machine technology provided by other vendors.

As further shown in FIG. 1, a backup agent 201 is provided that uses a special interface Vix API (i.e., VSphere that provides for communication between the host-guest system and the system) to put files (e.g., tools and utilities) on the same channel that is executing these programs. In particular, the backup agent 201 is provided to collect metadata and store the metadata on the C: drive (i.e., the system drive) of the ESX host system, as well as to automatically store this information into the archive.

According to one existing backup method, the backup agent 201 can be installed outside the ESX Host 101. However, a set of backup agent files 203 must be transmitted and saved inside the virtual machine 102 on the ESX host 101 using native Vix API interface 202. These files are copied into ESX host 101 and then from the ESX host 101 to the virtual machine 102 into temporary directory on system volume C: drive of the virtual machine disk 103. The backup agent files 203 (i.e., the "mini agent" discussed above) then can collect metadata of the applications, including, for example, a Microsoft SQL® 104 and other applications 105 into a directory (e.g., CAMetadata 106) that is stored in the root directory of system volume C: drive of the virtual machine 102. Next, a shadow copy or volume snapshot service snapshot (e.g., a VSS-snapshot) of the virtual machine 102 is created and certain post-snapshot operations (e.g., truncate logs, and the like) are performed as is known to one skilled in the art. Once the VSS snapshot is created, a backup copy of the virtual machine data file can be created and all data collected can automatically be stored into archive. Finally, the VSS snapshot can be deleted and the backup agent files 203 can be optionally removed.

Thus, as shown in FIG. 1, the existing systems for performing a backup procedure of a virtual machine are not in fact "agentless" since of backup agent files 203 must be saved to the virtual machine 102. Moreover, there are certain technical disadvantages with these systems. For example, with the backup agent files 203, "waste products", for example, utilities can remain inside the virtual machine and are essentially unnecessary waste. Moreover, a secondary backup of the backup may not be compatible with the physical machine (i.e., the host system), such that the data may not be subject to backup host machine itself, in the way of its drive. Moreover, during the backup process, there can be significant intervention to the guest of the virtual machine, for example, certain components of VSS-to-integrate will be substituted into the VSS backup. Yet further, the VSS-process in the guest machine is caused by the hypervisor (i.e., the ESX host 101, rather than the backup agent 201, making it difficult for the backup software application to fully control the backup process.

SUMMARY

Accordingly, a system and method is disclosed herein for performing agentless backup of a virtual machine using a temporary attached virtual disk.

In particular, according to a first aspect, a method is disclosed that includes creating, by a processor, a virtual machine disk in a datastore; loading, by the processor, a software application in the virtual machine disk, the software application being configured to collect metadata relating to at least one application executing in an operating system of the virtual machine; communicatively coupling the datastore to the virtual machine; collecting, by the software application, the metadata relating to the at least one application executing in the operating system of the virtual machine; generating a snapshot of the virtual machine; and storing, by the processor, a backup of the virtual machine in a backup archive based on the snapshot.

According to another aspect, the method includes recovering the at least one application executing in the operating system of the virtual machine in the event of an error of the at least one application executing based on the collected metadata.

According to another aspect, the method includes deleting, by the processor, the snapshot of the virtual machine after the snapshot is stored in the backup archive.

According to another aspect, the method includes partitioning, by the processor, the virtual machine disk into two partitions with a first partition as a read-only partition and a second partition as a read-write partition; and loading, by the processor, the software application in the read-only partition.

According to another aspect, the method includes creating, by a processor, another virtual machine disk in the datastore; allocating the virtual machine disk for read-only operations and the another virtual machine disk for read-write operations; loading, by the processor, the software application in the virtual machine disk allocated for read-only operations.

According to another aspect, the method includes communicatively coupling the datastore to the virtual machine in an independent mode.

According to an aspect, a system is disclosed for generating a backup of a virtual machine. In this aspect, the system includes a datastore; and a processor configured to create a virtual machine disk in a datastore; load a software application in the virtual machine disk, the software application being configured to collect metadata relating to at least one application executing in an operating system of the virtual machine; communicatively couple the datastore to the virtual machine; send at least one instruction to the software application in the virtual machine disk to collect the metadata relating to the at least one application executing in the operating system of the virtual machine; generate a snapshot of the virtual machine; and store a backup of the virtual machine in a backup archive based on the snapshot.

According to another aspect, a non-transitory computer readable medium storing computer executable instructions is disclosed for generating a backup of a virtual machine. In this aspect, the medium includes instructions for creating a virtual machine disk in a datastore; loading a software application in the virtual machine disk, the software application being configured to collect metadata relating to at least one application executing in an operating system of the virtual machine; communicatively coupling the datastore to the virtual machine; collecting the metadata relating to the at least one application executing in the operating system of the virtual machine; generating a snapshot of the virtual machine; and storing a backup of the virtual machine in a backup archive based on the snapshot.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

Figure 2:
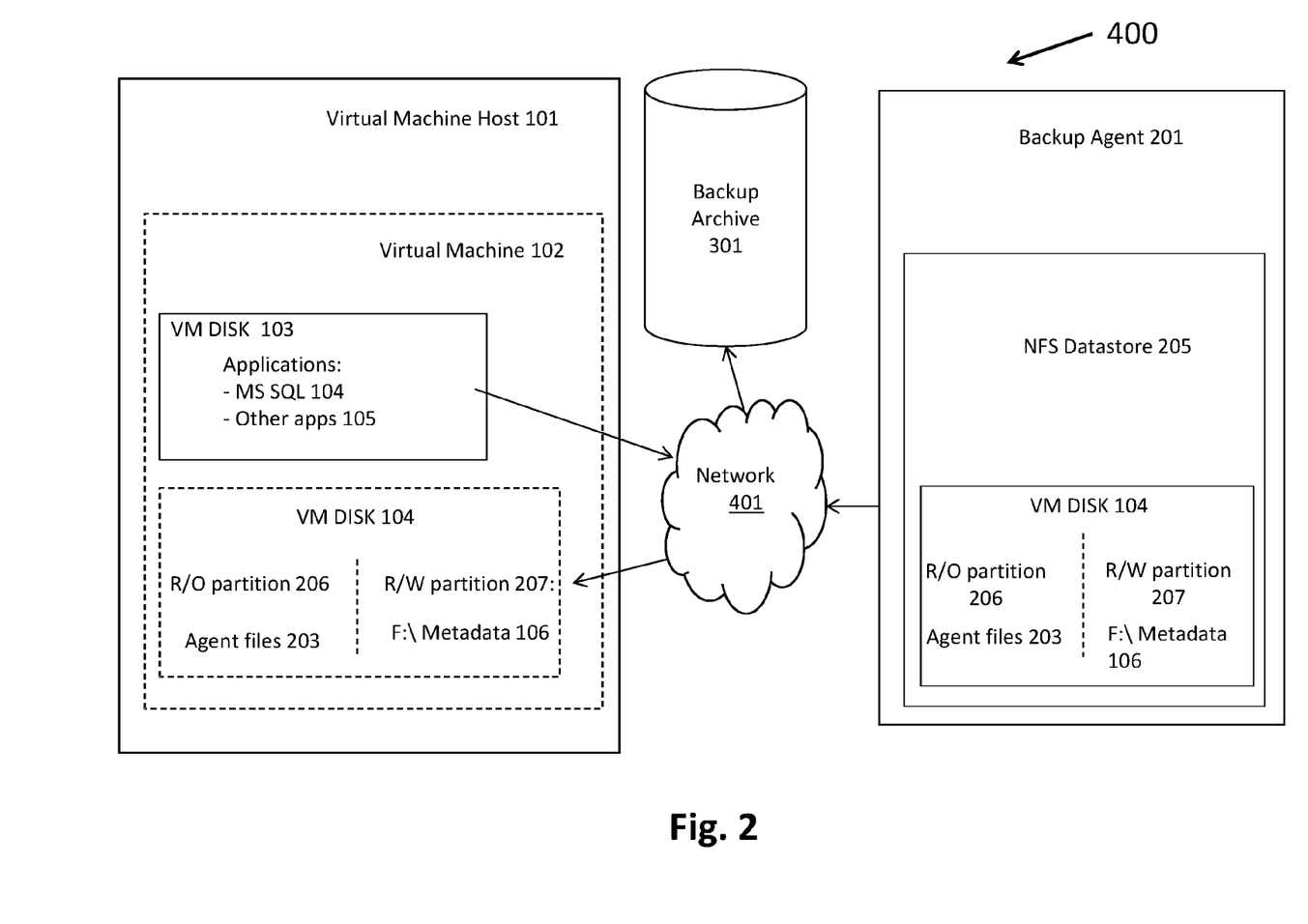
FIG. 2 is a block diagram illustrating a system for performing agentless backup of a virtual machine using a temporary attached virtual disk according to an exemplary aspect.

FIG. 2 is a block diagram illustrating a system for performing agentless backup of a virtual machine using a temporary attached virtual disk according to an exemplary aspect. As shown in FIG. 2, the data backup system 200 generally includes a host machine 101, a backup agent 201, a backup archive 301 and a network 401. As further described above, one or more virtual machines (illustrated as virtual machine 102) can be run on the host machine 101. The virtual machine can be configured using any server virtualization technology, as would be understood to one skilled in the art, such as vSphere® described above. Thus, the host machine 101 can be an ESX host 101 accordingly to an exemplary aspect, although the disclosure herein should in no way be understood to be limited to the vSphere® virtualization technology.

Moreover, the backup archive 301 can be any type of electronic memory configured to store the backup data of the virtual machine created by the exemplary system and method. For example, the backup archive 301 can include one or more disks on servers for data storage. According to one aspect, it is contemplated that the data archive 301 can generally include hardware and software components configured to manage various storage resources within the computing environment. For example, the data archive can include typical data storage devices, such hard disk drives, optical drives, magnetic tape drives and/or the like.

As further shown, a backup agent 201 is provided to control and manage the data backup process of the virtual machine according to the exemplary aspect. As will be described in more detail below, the backup agent 201 is configured to manage a network file system datastore 205 that can be connected to the system. It should be appreciated that the different components of system 200 can communicate over network 401. According to the exemplary aspect, network 401 can be any network for communicating data and data operations and can include a communication system (not shown) that connects the various computers of the system by wire, cable, fiber optic, and/or wireless links facilitated by various types of well-known network elements, such as hubs, switches, routers, and the like. Network 401 may employ various well-known protocols to communicate information amongst the network resources. In one aspect, the network 401 can be part of the Internet or intranet using various communications infrastructure such as Ethernet, WiFi and the like.

Thus, using network 401, the network file system datastore 205 on a network resource can be mounted to system 200 and, more specifically, communicatively coupled to the host machine 101 and/or the virtual machine 102. As should be understood to those skilled in the art, the network file system datastore 205 can be a repository for persistently storing and managing collections of data. Moreover, backup agent 201 can include a software application that is configured to create two partitions on the network file system datastore 205 as shown. More specifically, according to the exemplary aspect, the backup agent 201 can create a virtual machine disk 104 (i.e., "VMDK") in the network file system datastore 205 than be divided to two partitions, and, specifically, a first partition 206 (i.e., a read-only "R/O" partition) and a second partition 207 (i.e., a read-write "R/W" partition). Although the exemplary aspect is described as having one virtual machine disk 104 with two partitions, it should be understood that this implementation is a matter of technical design. In an alternative aspect, the backup agent 201 can create two or more virtual machine disks on the network file system datastore 205 with one disk being allocated for the R/O partition and a second disk being allocated for the R/W partition.

Moreover, the backup agent 201 is configured to load the backup agent files 203 described above onto the R/O partition 206 as shown. As noted above, the backup agent files 203 are configured to perform certain operations during the backup process, such as collecting metadata of the applications, including, for example, a Microsoft SQL® 104 and other applications 105. Moreover, as further shown, the R/W partition 207 includes an F: drive 106 for storing the collected metadata. The F: drive can be considered allocated space on the networked drive (i.e., network file system datastore 205) and personal to the user of the virtual machine, such that it is only accessible to the user who is logged into the virtual machine.

As further shown, the virtual machine disk 104 can then be attached to the virtual machine 102 as a virtual drive via network 401, for example. According to the exemplary aspect, the backup agent is configured to connect the virtual machine disk 104 in an "independent mode" in which the attached drives of the virtual machine disk 104 are not included in a snapshot. More particularly, when the virtual machine 102 is operating in normal mode, any connected disks would be included in snapshots taken of the virtual machine 102 and/or the virtual machine disk 103. In contrast, using the independent mode, data on the virtual machine disk 104 would not be recorded when a snapshot is taken of the virtual machine 102. Advantageously, by connecting and disconnecting the virtual machine disk 104 after the snapshot is generated, the exemplary system and method enables a backup to be generated without making any changes to the inside of the virtual machine 102. Instead, after the backup is generated, the virtual machine 102 and virtual machine disk 103 remain exactly in the same state as before the backup. This design and functionality is clearly preferable from the point of view of the user as it excludes any external intervention, the consequences of which may be unpredictable or even potentially dangerous. Furthermore, according to one aspect, if the virtual machine disk 104 is configured to be in independent mode, it can be specified whether changes made to the disk are to persist or to be discarded when the virtual machine is powered off or a snapshot is restored.

Once the network file system datastore 205 is connected to the virtual machine 102, the backup agent files 203 can collect metadata related to the software applications. In particular, the metadata in this context is a set of data that describes specifics of the one or more software applications installed inside the backed up virtual machine 102. For example, in case of MS SQL 104, the metadata will contain the paths to SQL databases, their transaction logs, Windows registry entries, and the like. According to an exemplary aspect, this metadata facilitates a granular recovery of application items from the virtual machine backup as described herein and properly maps them into the existing application, for example, to recover SQL database files into their original location inside the virtual machine 102 while executing the recovery process in agentless mode.

As shown, the metadata collected by the backup agent files 203 can be stored in the F: drive 106 of the R/W partition 207 of the virtual disk 104. The metadata can then be used to create the snapshot of the virtual machine disk 103 of the actual virtual machine 102, that can include data relating to the MS SQL 104 and other applications 105. Advantageously, since the virtual disk 104 is attached within the "independent mode", the content of the virtual disk 104, including the backup agent files 203, is not included in the snapshot. Once the snapshot is created, the backup agent files 203 can perform certain post-snapshot operations, such as executing service batch files, or the like, before a backup archive 301 is created on backup storage as shown. Finally, the backup agent 201 can communicate with the ESX host 101 in order to delete the snapshot. According to an example aspect, the virtual machine snapshot may be deleted as soon as the snapshot is created. In an example aspect, the time between creation and deletion of the virtual machine snapshot may be a few seconds.

It should be noted that while backup archive 301 is shown as being coupled to the system 200 through network 401, in an alternative aspect, the backup archive can be coupled directly to one of the virtual machine host 101 and/or the backup agent 201, for example.

Figure 3:
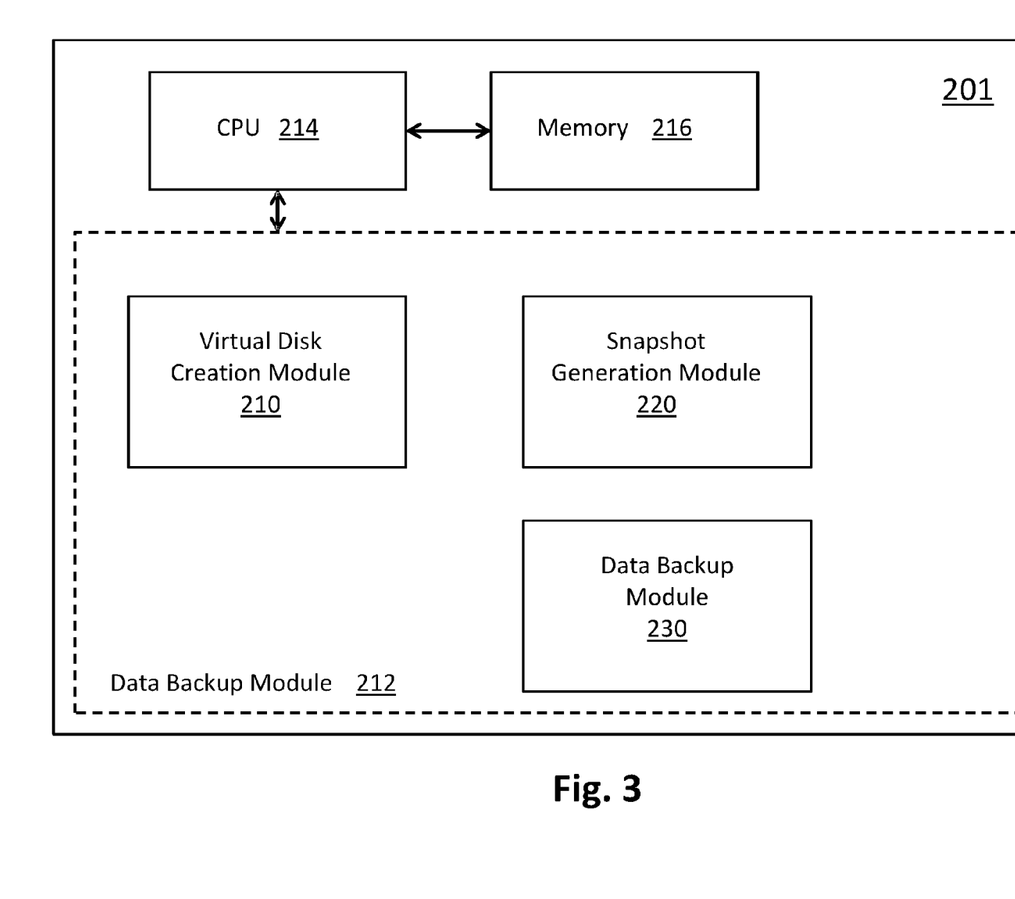
FIG. 3 illustrates a block diagram of backup agent for performing a backup of a virtual machine according to an exemplary aspect.

FIG. 3 illustrates a block diagram of a computer configured to implement a backup agent application for performing a backup of a virtual machine according to an exemplary aspect. According to the exemplary aspect, the backup agent 201 can be implemented on a general-purpose computer system of which the specific hardware details will be described below with respect to FIG. 5. However, as generally shown in FIG. 3, the backup agent 201 can be implemented including a data backup module 212 with a computer-processing unit ("CPU") 214 and memory 216. The data backup module 212 is provided as a software application configured to facilitate the management of data backup of virtual machines, such as virtual machine 102 described above with respect to FIG. 2.

As shown, the data backup module 212 of the backup agent 201 includes modules that are configured to perform the algorithms described herein for generating a backup of a virtual machine according to the exemplary aspect. Specifically, according to the exemplary aspect shown in FIG. 3, the data backup module 212 can be composed of a plurality of modules. As used herein, the term "module" refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

As shown, the data backup module 212 includes a virtual disk creation module 210 that is configured to create a virtual machine disk for the data back process, such as virtual machine disk 104 described above. More specifically, once a user (e.g., a system administrator) connects a network file system datastore 205 to the system 200 and network 401, the virtual disk creation module 210 is configured to identify the network file system datastore 205 allocate a portion of the memory of the network file system datastore 205 for the virtual machine disk 104. Furthermore, the virtual disk creation module 210 is configured to divide the virtual machine disk 104 into two partitions as described above. In particular, the first partition 206 can be a read-only "R/O" partition and the second partition 207 can be a read-write "R/W" partition according to the exemplary aspect. In addition, the virtual disk creation module 210 is configured to load the backup agent files 203 in the RIO partition 206 as described above.

The data backup module 212 further includes a snapshot generation module 220. Specifically, in a response to a request for generating a snapshot of the virtual machine 102 and/or virtual machine disk 103 of the virtual machine 102 (which can be generated by a user or automatically/periodically by the computer), the snapshot generation module 220 is configured to attach the virtual machine disk 104 to the virtual machine 102 in "independent mode". The snapshot generation module 220 is further configured to send commands to the backup agent files 203 to collect necessary metadata from the virtual machine 102 and/or virtual machine disk 103 and store this data in the R/W partition 207. Moreover, according to one exemplary aspect, the snapshot generation module 220 locks the guest operating system that is executing within virtual machine 102 via executable scripts or the like. Once locked, the snapshot generation module 220 is further configured to transmit a command to the guest operating system of the virtual machine 102 to generate the snapshot of the virtual machine disk 103 or a subset thereof. Once a snapshot is generated, the data backup module 230 is configured to store a copy of the data backup to the backup archive 301 by sending a copy of the data and instructions for storing the data to the storage device allocated for the data archive.

Figure 4A:
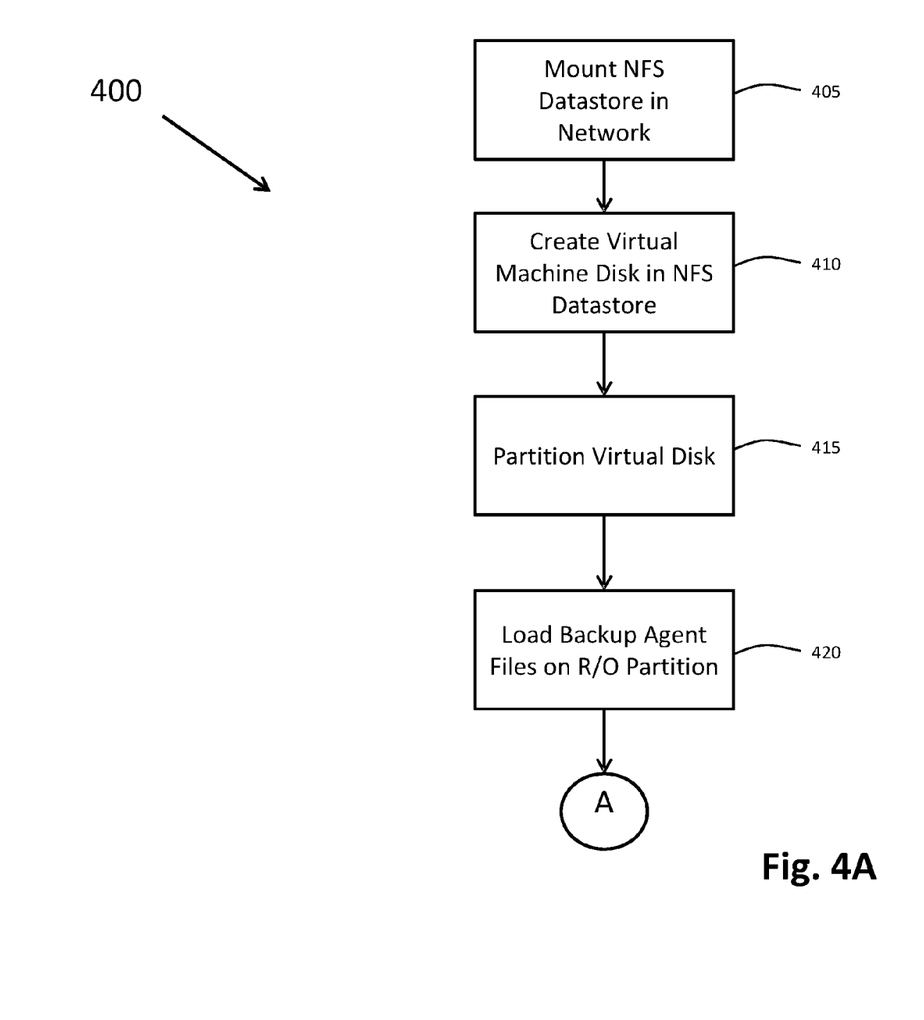
FIG. 4A through 4C illustrates a flowchart for a method for performing agentless backup of a virtual machine using a temporary attached virtual disk according to an exemplary aspect.
Figure 4B:
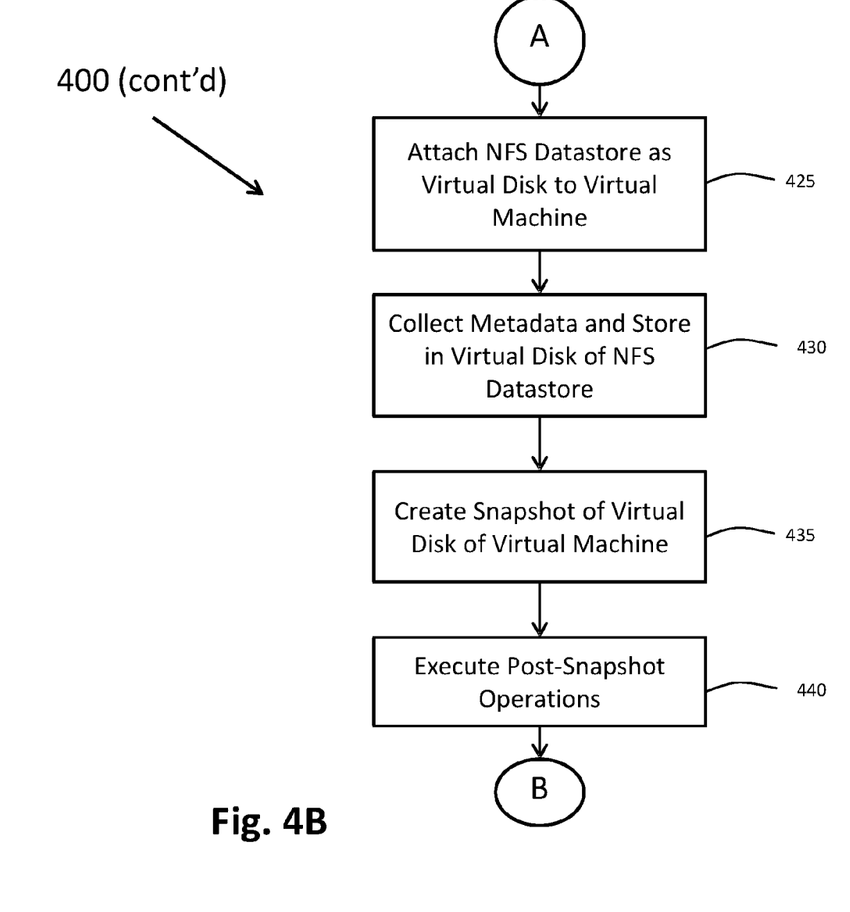
Figure 4C:
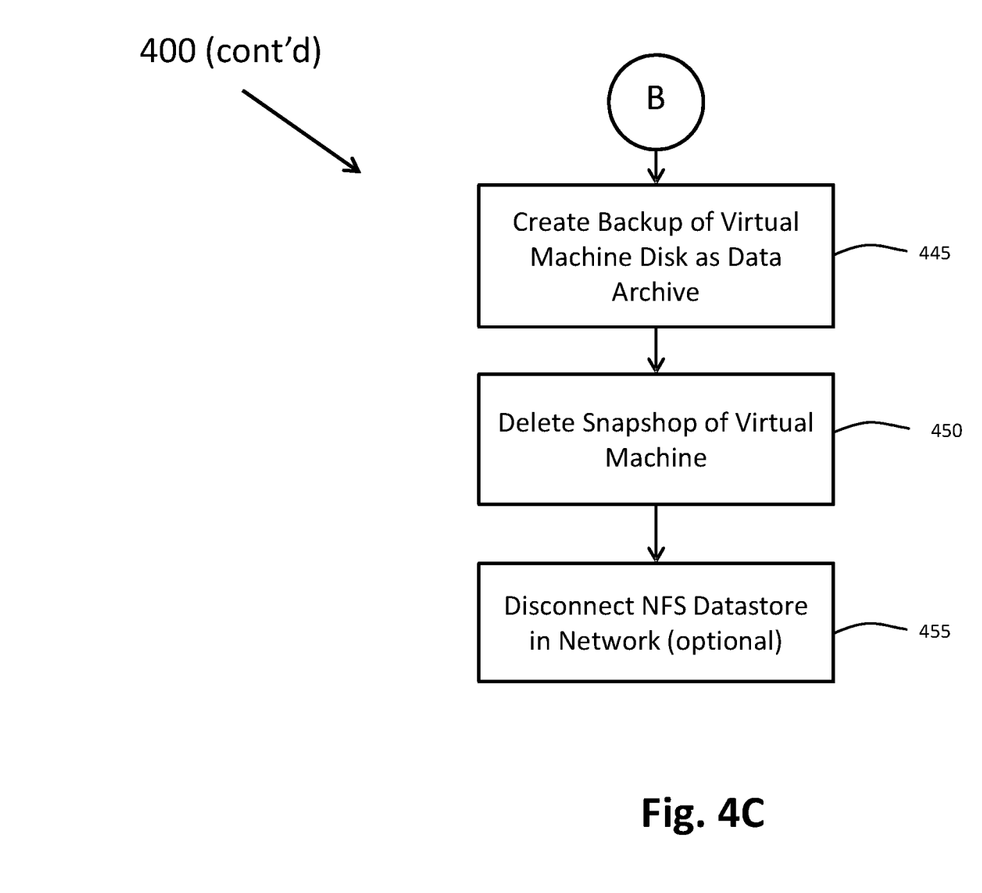

FIGS. 4(a) through 4(c) illustrates a flowchart for a method for performing agentless backup of a virtual machine using a temporary attached virtual disk according to an exemplary aspect. As shown, initially at step 405, a network file system datastore 205 on a network resource can be mounted to the network. According to an exemplary aspect, the data backup module 212 runs an NFS server service that provices NFS share for external access. Later, this NFS share is mounted as datastore on the virtual machine host 101 (e.g., the ESXi host) using VMware API methods, for example CLI interface. This mounting is performed by the data backup module 212 that connects to the virtual machine host 101 (e.g., the ESXi host) over network 401 and instructs it to register NFS datastore. Next, the backup agent 201, which is constituted by a software application, can create a virtual machine disk 104 in the network file system datastore 205 at step 410. This virtual machine disk 104 can then be partitioned by the backup agent 201 at step 415, according to an exemplary aspect. As described above, the virtual machine disk 104 can be divided into two partitions: a first R/O partition 206 and a second R/W partition 207. Then, at step 420, the backup agent 201 can load the backup agent files 203 onto the R/O partition 206 of the virtual machine disk 104.

Next, the method transitions to FIG. 4B. At step 425, the network file system datastore 205 can be attached to the virtual machine as a virtual disk. As described above, the backup agent 201 connects the network file system datastore 205 in an "independent mode" in which the attached drives, including the virtual machine disk 104, are not included in a snapshot of the virtual machine or a subset of its data file. Once the network file system datastore 205 is connected to the virtual machine 102, the backup agent files 203 can collect all metadata from the virtual machine (step 430) necessary to perform the snapshot of the virtual machine disk. As described above, the metadata can be stored in the F: drive 106 of the R/W partition 207 of the virtual disk 104. The metadata can then be used to create the snapshot of the virtual machine disk 103 of the actual virtual machine 102 at step 435, that can include data relating to the MS SQL 104 and other applications 105. As described above, since the virtual disk 104 is attached in the "independent mode", the content of the virtual disk 104 is not included in the snapshot. Once the snapshot is created, the backup agent files 203 can perform certain post-snapshot operations, such as executing service batch files, or the like at step 440.

The method then proceeds to FIG. 4C. At step 445, a backup archive 301 is created on backup storage 301 as shown by the backup agent 201 where the backup can be based on the snapshot generated of the virtual machine 102. Once the backup is created, the backup agent 201 can communicate with the virtual machine host 101 in order to delete the snapshot at step 450. Optionally, the network file system datastore 205 can then be disconnected from the network and/or virtual machine 102.

It should be appreciated that while the foregoing exemplary aspect is described in terms of generating a snapshot and storing it as a data backup, the exemplary system and method can be implemented for restoring the virtual machine 102 (i.e., the system can be designed as an application-extension, describing the restore). For example, in addition to connecting the virtual machine disk 104 as described above, it is necessary to connect more disks with data from the archive for their effective access to them during the data recovery process. More specifically, it is necessary because in some situations it is necessary to carry out the recovery from within a virtual machine, and not from outside. Thus, the disclosed system and method described herein can be used to restore the files (e.g., virtual machine disk 103) inside a virtual machine 102. In this aspect, agent network connection to a virtual machine is not required, which is advantageous since, in many situations, the network route "from the virtual machine to the agent" simply does not exist, and therefore the alternative recovery methods impossible.

For example, referring back to FIG. 2, the R/O partition 206 and R/W partition 207 can be utilized as recovery data sources. Specifically, the data on these partitions is generated by the backup agent 201 that has access to the backup archive 301 and expands the contents of this backup archive 301 onto these partitions (i.e., R/O partition 206 and R/W partition 207) because they are also locally accessible by backup agent 201. Therefore, the recovery data (e.g., the files/folders) is also accessible locally from inside the virtual machine 102, e.g. by the guest operating system of the virtual machine 102, which can copy the files from these partitions (because they appear as additional local drives) and put them onto original virtual machine disk 103. According to an exemplary aspect, the workflow includes first generating by the backup agent 201 virtual disk files with required contents (which should be placed into target virtual machine) on NFS share hosted by this agent. Next, the NFS share is mounted as the NFS datastore on the virtual machine host 101 (e.g., the ESXi host) and then the virtual disk from this NFS datastore is attached to the designated virtual machine. Finally, the recovery is executed inside the virtual machine locally via copying files from this attached virtual disk to existing original disk(s) of the virtual machine.

Figure 5:
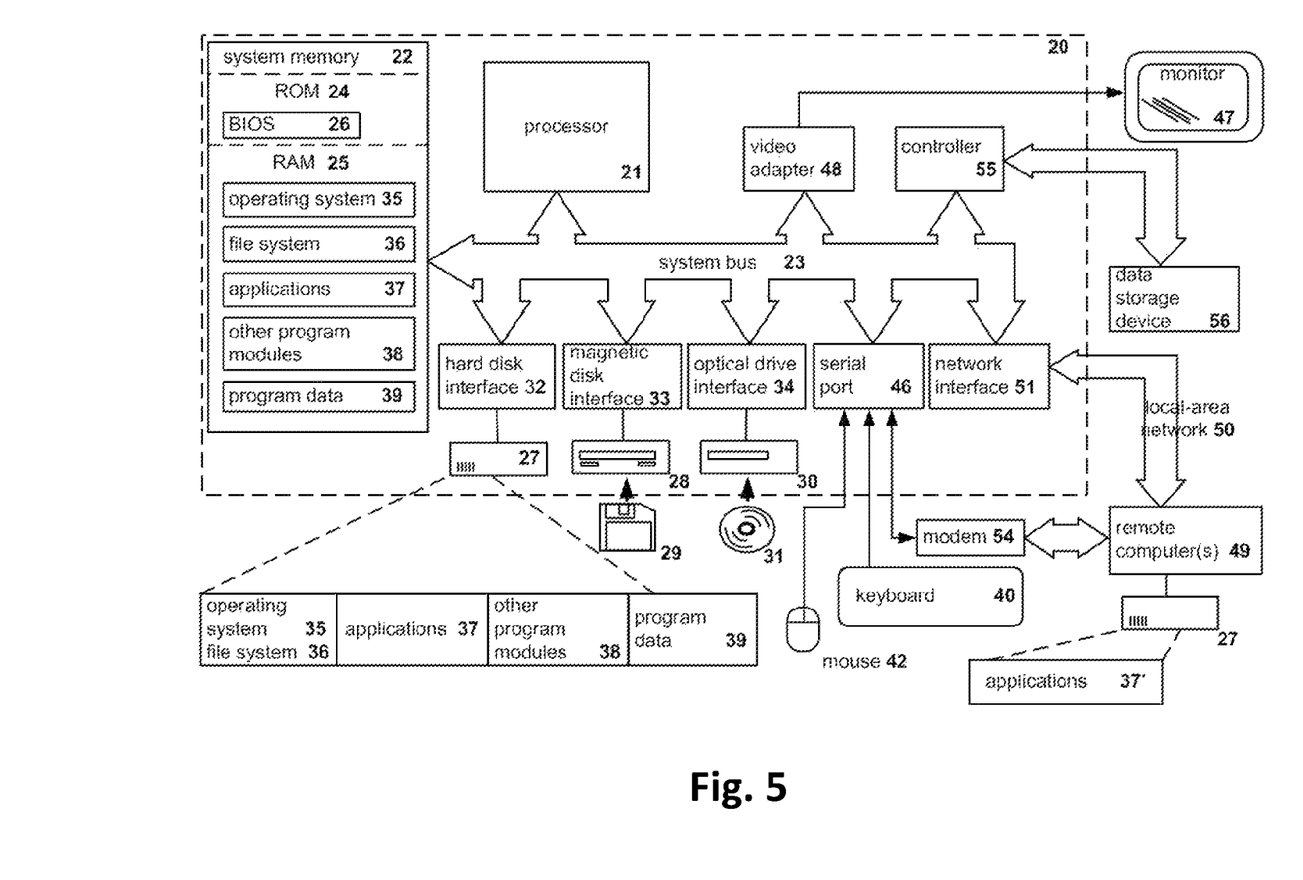
FIG. 5 illustrates an example of a general-purpose computer system on which the disclosed systems and method can be implemented.

FIG. 5 illustrates an example of a general-purpose computer system (which may be a personal computer or a server) on which the disclosed systems and method can be implemented according to an example aspect. It should be appreciated that the detailed general-purpose computer system can correspond to the computer provide to implement the backup agent 201 described above with respect to FIG. 3.

As shown in FIG. 5, the computer system 20 includes a central processing unit 21, a system memory 22 and a system bus 23 connecting the various system components, including the memory associated with the central processing unit 21. The central processing unit 21 can correspond to the CPU 214 and the system memory 22 can correspond to memory 216 of FIG. 3, according to an exemplary aspect. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for generating a backup of a virtual machine, the method comprising:
   creating, by a processor, a virtual machine disk with a plurality of partitions in a datastore;
   creating at least one partition of the plurality of partitions as a read-only partition and at least another partition of the plurality of partitions as a read-write partition;
   loading, by the processor, a software application in the read-only partition of the virtual machine disk, the software application being configured to collect metadata relating to at least one application executing in an operating system of the virtual machine;
   communicatively coupling the datastore to the virtual machine;
   collecting, by the software application, the metadata relating to the at least one application executing in the operating system of the virtual machine and storing the metadata in a portion of the read-write partition, in order to facilitate recovery of the at least one application from a backup archive;
   generating a snapshot of the virtual machine;
   performing post-snapshot operations on the snapshot; and
   storing, by the processor, a backup of the virtual machine in the backup archive based on the snapshot.

2. The method according to claim 1, further comprising recovering the at least one application executing in the operating system of the virtual machine in the event of an error of the at least one application executing based on the collected metadata.

3. The method according to claim 2, further comprising deleting, by the processor, the snapshot of the virtual machine after the backup of the virtual machine is stored in the backup archive.

4. The method according to claim 1, further comprising:
   creating, by a processor, another virtual machine disk in the datastore;
   allocating the virtual machine disk for read-only operations and the another virtual machine disk for read-write operations;
   loading, by the processor, the software application in the virtual machine disk allocated for read-only operations.

5. The method according to claim 1, further comprising communicatively coupling the datastore to the virtual machine in an independent mode.

6. The method of claim 1, wherein the post-snapshot operations comprises executing service batch files.

7. The method of claim 1, further comprising:
   restoring the snapshot from the backup device to the virtual machine; and
   mapping the metadata corresponding to the at least one application into their original location.

8. A system for generating a backup of a virtual machine, the system comprising:
   a datastore; and
   a processor configured to:

create a virtual machine disk with a plurality of partitions in a datastore;
create at least one partition of the plurality of partitions as a read-only partition and at least another partition of the plurality of partitions as a read-write partition;
load a software application in the read-only virtual machine disk, the software application being configured to collect metadata relating to at least one application executing in an operating system of the virtual machine;
communicatively couple the datastore to the virtual machine;
send at least one instruction to the software application in the virtual machine disk to collect the metadata relating to the at least one application executing in the operating system of the virtual machine and to store the metadata in a portion of the read-write partition, in order to facilitate recovery of the at least one application from a backup archive;
cause a snapshot of the virtual machine to be generated;
perform post-snapshot operations on the snapshot; and
store a backup of the virtual machine in the backup archive based on the snapshot.

9. The system according to claim 8, wherein the processor is further configured to recover the at least one application executing in the operating system of the virtual machine in the event of an error of the at least one application executing based on the collected metadata.

10. The system according to claim 8, wherein the processor is further configured to delete the snapshot of the virtual machine after the backup of the virtual machine is stored in the backup archive.

11. The system according to claim 8, wherein the processor is further configured to:
create another virtual machine disk in the datastore;
allocate the virtual machine disk for read-only operations and the another virtual machine disk for read-write operations;
load the software application in the virtual machine disk allocated for read-only operations.

12. The system according to claim 8, wherein the processor is further configured to communicatively couple the datastore to the virtual machine in an independent mode.

13. The system of claim 8, wherein the post-snapshot operations comprises executing service batch files.

14. A non-transitory computer readable medium storing computer executable instructions for generating a backup of a virtual machine, including instructions for:
creating a virtual machine disk with a plurality of partitions in a datastore;
creating at least one partition of the plurality of partitions as a read-only partition and at least another partition of the plurality of partitions as a read-write partition,
loading a software application in the read-only virtual machine disk, the software application being configured to collect metadata relating to at least one application executing in an operating system of the virtual machine;
communicatively coupling the datastore to the virtual machine;
collecting the metadata relating to the at least one application executing in the operating system of the virtual machine and storing the metadata in a portion of the read-write partition, in order to facilitate recovery of the at least one application from a backup archive;
generating a snapshot of the virtual machine;
performing post-snapshot operations on the snapshot; and
storing a backup of the virtual machine in the backup archive based on the snapshot.

15. A non-transitory computer readable medium according to claim 14, further including instructions for recovering the at least one application executing in the operating system of the virtual machine in the event of an error of the at least one application executing based on the collected metadata.

16. A non-transitory computer readable medium according to claim 14, further including instructions for deleting the snapshot of the virtual machine after the backup of the virtual machine is stored in the backup archive.

17. A non-transitory computer readable medium according to claim 14, further including instructions for:
creating, by a processor, another virtual machine disk in the datastore;
allocating the virtual machine disk for read-only operations and the another virtual machine disk for read-write operations;
loading, by the processor, the software application in the virtual machine disk allocated for read-only operations.

18. A non-transitory computer readable medium according to claim 14, further including instructions for communicatively coupling the datastore to the virtual machine in an independent mode.

* * * * *